US006632162B1

(12) United States Patent
Wilkinson

(10) Patent No.: US 6,632,162 B1
(45) Date of Patent: Oct. 14, 2003

(54) METHOD OF MAKING TRAY LINERS FOR ITEM STORAGE CONTAINERS

(76) Inventor: Dennis Wilkinson, 214 Hickling Trail, Barrie, Ontario (CA), L4M 5W4

(*) Notice: Subject to any disclaimer, the term of this patent is extended or adjusted under 35 U.S.C. 154(b) by 101 days.

(21) Appl. No.: 09/722,444

(22) Filed: Nov. 21, 2000

(51) Int. Cl.⁷ .............................................. B29C 33/12
(52) U.S. Cl. .......................... 493/93; 493/94; 493/95; 493/191; 493/192; 493/945; 264/130; 264/257
(58) Field of Search ........................... 493/93–95, 191, 493/192, 945; 264/321, 130, 257; 206/349, 372, 428, 158; 428/36.5; 53/440, 127

(56) References Cited

U.S. PATENT DOCUMENTS

| | | | | |
|---|---|---|---|---|
| 3,406,234 A | * | 10/1968 | Bailly | 264/257 |
| 3,670,064 A | * | 6/1972 | Edwards et al. | 264/130 |
| 4,242,074 A | * | 12/1980 | Lake | 264/163 |
| 4,964,514 A | * | 10/1990 | Wycech | 264/163 |
| 5,320,223 A | * | 6/1994 | Allen | 206/523 |
| 5,409,560 A | * | 4/1995 | Hammer et al. | 156/248 |
| 5,435,864 A | * | 7/1995 | Machacek et al. | 206/372 |
| 5,855,833 A | * | 1/1999 | Stanley et al. | 264/129 |

* cited by examiner

Primary Examiner—Rinaldi I. Rada
Assistant Examiner—Brian Nash
(74) Attorney, Agent, or Firm—Elias C. Borges

(57) ABSTRACT

A method for making recessed tray liners for storing objects in a storage container is disclosed. The first step in the method is to size a structural thermoplastic foam liner to fit within a tray. The foam liner is preferably a foamed polyethylene plastic. After the tray is lined with the foam liner, the object or objects to be held in the tray are then heated to a temperature sufficient to soften the thermoplastic foam. The temperature of the heated object is selected to be above the softening temperature of the thermoplastic foam, but below the melting temperature of the foam. After the object or objects have reached the appropriate temperature, the heated object is pressed into the foam lining to form a cavity. The heated foam will flow such that the cavity will conform to the contours of the object being pressed into the foam. After the object is sufficiently pressed into the foam, it is rapidly cooled to a temperature below the softening temperature of the foam. Preferably, the cooling is achieved by quenching the object with a fluid having a temperature lower than the softening temperature of the foam. Water is a suitable cooling fluid.

12 Claims, 3 Drawing Sheets

METHOD OF MAKING TRAY LINERS FOR ITEM STORAGE CONTAINERS

FIELD OF THE INVENTION

The invention relates generally to item storage boxes, such as tool boxes, that a consumer can customise to correspond to the items to be stored.

BACKGROUND OF THE INVENTION

Consumers often store tools and other objects in storage containers. These storage containers generally have one or more trays which are adapted to receive the objects. Oftentimes, to assist the consumer in organising their tools or other objects, storage containers are provided with tray liners having recessed cavities. These cavities are generally configured to conform to the outline of the object intended to be stored in the cavity.

While preformed recessed tray liners are available, they are only useful if sold with the tools or items to be stored in the tray. Preformed recessed tray liners are of little value to users who already have an assortment of tools and other items, many of which have profiles that do not correspond to the recessed cavities of the preformed tray liners. Therefore, there exists a need for customisable tray liners that can be adapted for the user's specific needs. In particular, there is a need for a tray liner that can be adapted to form recessed cavities dimensioned to conform to the users existing tools.

Attempts have been made to create customisable tray liners. These prior tray liners generally took the form of plastic tray liners that could be cut to form recessed cavities configured to receive the users tools. These prior tray liners have their disadvantages. Firstly, cutting the plastic material forming the tray liners does not always result in a neat looking recessed cavity. Furthermore, because the action of cutting out the liner requires the use of tracing pens and sharp knives, the recessed cavities do not always tightly conform to the profile of the corresponding object. Finally, if the object had a curved or rounded shape, then the cut out cavities could not easily be formed to tightly adhere to the curved shape of the object. Therefore, the need still exists for a simple to use method of forming recessed tray liners where the recessed cavities closely correspond to the size and shape of the corresponding objects.

SUMMARY OF THE INVENTION

In accordance with the present invention, a method for making tray liners for storing objects in a storage container is disclosed. The first step in the method is to size a structural thermoplastic foam liner to fit within the tray. After the tray is lined with the foam liner, the object or objects to be held in the tray are then heated to a temperature sufficient to soften the thermoplastic foam. After the object or objects have reached the appropriate temperature, the heated object is pressed into the foam lining to form a cavity. The heated foam will flow such that the cavity will conform to the contours of the object being pressed into the foam. After the object is sufficiently pressed into the foam, it is rapidly cooled to a temperature below the softening temperature of the foam.

DETAILED DESCRIPTION OF THE INVENTION

Figure 1:
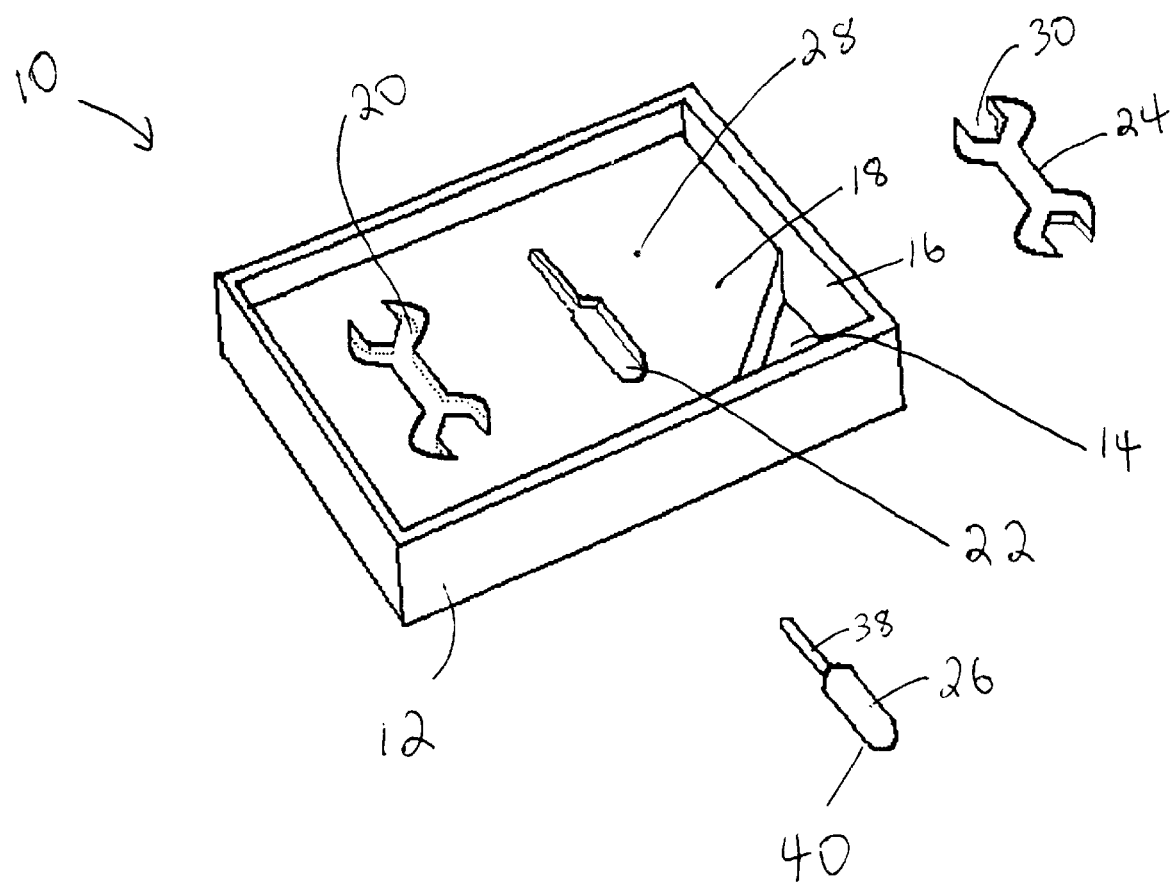
FIG. 1. is a perspective view, partly in section, of an item storage tray made in accordance with the invented method showing the items to be stored.

Referring firstly to FIG. 1, an object storage tray made in accordance with the method is shown generally as item 10 and consists of tray 12 having bottom 14, side walls 16 and structural foam liner 18. Foam liner 18 is provided with cavities 20 and 22 dimensioned to correspond to the outline of objects 24 and 26 respectively. Foam liner 18 is made of a thermoplastic foam material having sufficient density to structurally support heavy items. Preferably, foam liner 18 is made from an Etha Polyethylene foam having a density of approximately 2 lbs per cubic foot. Several suitable thermoplastic foam materials are available on the market.

Figure 2:
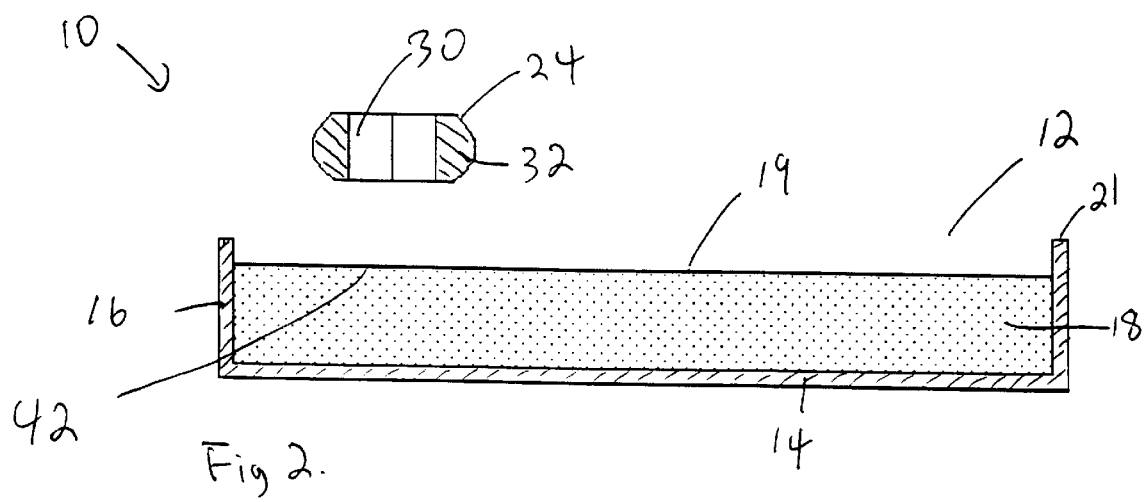
FIG. 2. is a cross sectional view of an item storage tray with the heated item suspended above a desired location on the tray.
Figure 3:
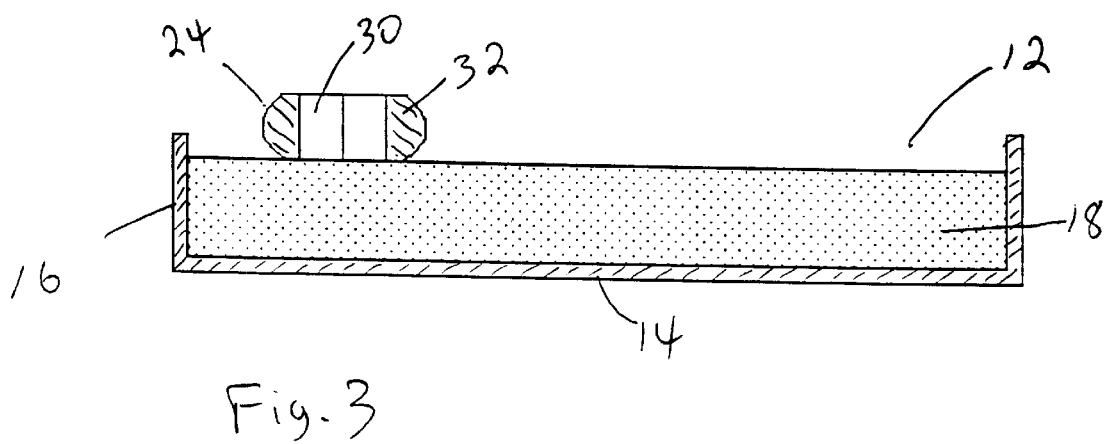
FIG. 3. is a cross sectional view of an item storage tray with the heated item resting on the desired location of the tray.
Figure 4:
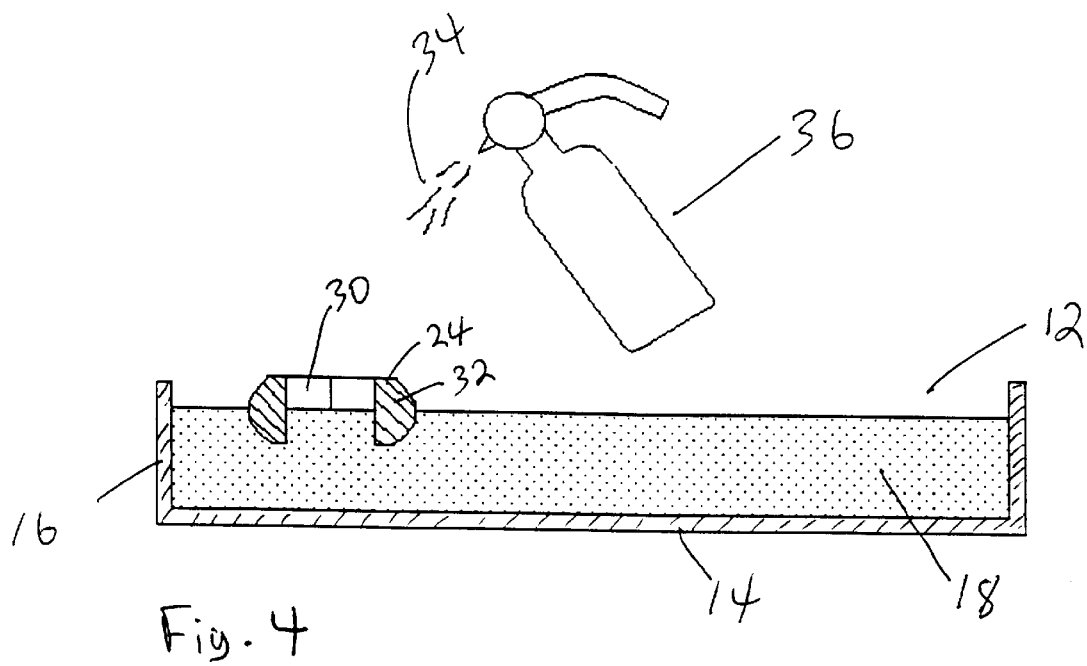
FIG. 4. is a cross sectional view of an item storage tray showing the heated item pressed into the tray.
Figure 5:
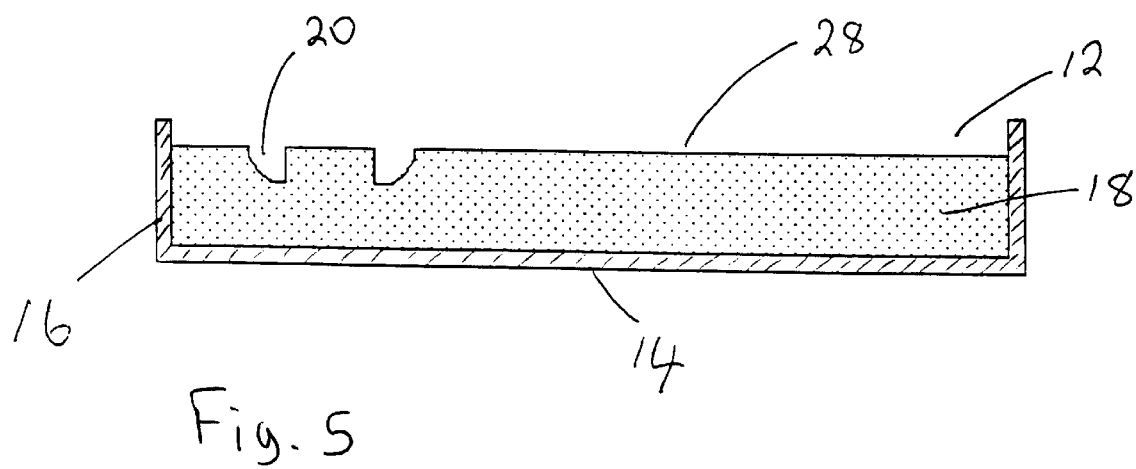
FIG. 5. is a cross sectional view of an item storage tray made in accordance with the invented method showing a recess configured to retain the item to be stored.

Referring now to FIGS. 2, 3 and 4, the method of the invention will now be described. Firstly, foam liner 18 is sized to fit snugly within tray 12. Preferably, the thickness of foam liner 18 is selected such that top surface 19 of foam liner 18 will be slightly below lip 21 of tray walls 16. Objects 24 are then arranged on surface 19 so that a suitable arrangement of the objects can be selected.

Once the desired location 42 of object 24 is selected, the object is heated to a temperature greater than the softening temperature of foam liner 18 and then placed on the desired location as shown in FIG. 3. While still at the desired temperature, object 24 is pressed into foam liner 18 with sufficient force to deform the foam liner. Preferably, object 24 is pressed into foam liner 18 to a depth equivalent to about half of the thickness of the object. As best seen in FIG. 4. object 24 heats foam liner 18 permitting the liner to deform and flow around the contours of the object such that opening 30 in object 24 is partially filled with foam liner 18 as the object is pressed into the liner.

When object 24 is at the desired depth, the object is rapidly cooled by applying a cooling fluid 34 onto the object. Cooling fluid 34 is at a temperature below the softening temperature of foam 18. As best seen in FIG. 4, cooling fluid 34 is preferably water which can be applied via spray bottle 36. Cooling object 24 also causes those portions of foam liner 18 immediately adjacent the object to cool. After object 24 has cooled to a temperature below the softening temperature of foam liner 18, the foam liner adjacent the object hardens and the object can be removed to leave cavity 20. It has been discovered that if object 24 is not quenched before trying to remove it, foam liner 18 will adhere to the object causing a deformation of cavity 20. Furthermore, if object 24 is not quenched with the cooling fluid, the portion of foam liner 18 adjacent the object will remain at an elevated temperature and will flow to cause additional deformation of cavity 20.

The temperature that object 24 is to be heated to is selected to be sufficient to deform foam 18 without melting it. Preferably, object 24 should be heated to a temperature higher than the softening temperature of foam 18. If structural foam 18 is made of Etho Polyethylene, then object 24 should be heated to approximately 400° F. Object 24 can be heated by any convenient method such as placing the object into a pre-heated oven or heating by means of a heat gun. If the tray is to hold several items, then all of the items can be heated together and placed on the foam one after the other. Since objects 24 are heated to relatively high temperatures, the user should use heat resistant gloves to handle the heated objects.

Object 24 should have sufficient heat energy to heat up foam liner 18 to a temperature greater than the softening temperature of the foam. Since the larger object 24 is, the longer it takes to heat to the appropriate temperature, it is advisable to heat larger objects for a longer time relative to smaller objects. One of the advantages of the present method is that if the temperature of object 24 is insufficient to permit deep penetration into foam 18, the object can be quenched, removed, re-heated and then re-inserted to a greater depth.

If object 24 has an oxidized metal coating, it will stick to foam 18 even after it has been quenched. To prevent sticking, object 24 is first coated with a releasing agent. The releasing agent can be a mineral powder such as talcum powder, or even baby powder. After coating, these objects are heated to the desired temperature and then pressed into foam 18. The objects are then quenched by applying a cooling fluid such as water. The releasing agent provides a barrier separating the oxidized metal surface of object 24 from foam 18. The releasing agent can then be washed off of object 24 after the object has been removed.

Referring back to FIG. 1, if several objects 24 are to stored onto the tray, then the method can be repeated for each object. Alternatively, all of the objects 24 can be heated at the same time and then placed onto foam liner 18 one after the other. Furthermore, any unoccupied space 28, on the surface of foam liner 18, can be reserved for storing objects which have not yet been acquired. When additional objects are acquired, they may be heated and pressed into an appropriate spot on section 28 of foam 18.

The above method may not be suitable for items having plastic handles or parts, since plastic parts may deform during the heating process. In the case if object 26 having metal portion 38 and plastic portion 40, corresponding cavity 22 may be formed in foam 18 by simply placing the object onto the foam and then cutting around the profile of the object with a sharp knife. Alternatively, object 26 may be placed on foam 18 at the desired location and the perimeter of the object may be traced onto the foam with a pen or similar implement. The user may then cut out the traced section with a knife. Removing the cut out section of foam 18 leaves cavity 22 having the desired configuration to receive object 26.

A specific embodiment of the present invention has been disclosed; however, several variations of the disclosed steps could be envisioned as within the scope of this invention. It is to be understood that the present invention is not limited to the embodiments described above, but encompasses any and all embodiments within the scope of the following claims.

Therefore, what is claimed is:

1. A method of making a liner for a tray to store objects, the method comprising the following steps:
    a sizing a structural foam liner to fit the tray, the foam liner being made of a thermoplastic foam having a softening temperature;
    b heating an object to be stored to a temperature above the softening temperature of the thermoplastic foam;
    c forming a cavity in the structural foam liner by pressing the heated object into the foam at a desired location on the foam, and
    d rapidly cooling the object to a temperature below the softening temperature of the foam by quenching the object with a fluid having a temperature lower than the softening temperature of the foam.

2. A method of making tray liners as defined in claim 1 wherein the quenching is achieved by spraying the object with water while the object is in the foam.

3. A method of making tray liners as defined in claim 1 wherein the object is coated with a material selected to prevent adhesion of the item to the foam.

4. A method of making tray liners as defined in claim 3 wherein the material selected to prevent adhesion is a mineral powder.

5. A method of making a liner for a tray to store a plurality of objects, the method comprising the following steps:
    a sizing a structural foam liner to fit the tray, the foam liner being made of a thermoplastic foam having a softening temperature;
    b heating a first object to be stored to a temperature above the softening temperature of the thermoplastic foam;
    c forming a cavity in the structural foam liner by pressing the heated object by hand into the foam at a desired location on the foam;
    d rapidly cooling the object to a temperature below the softening temperature of the foam by quenching the object with a fluid having a temperature lower than the softening temperature of the foam, and
    e repeating steps b through d for the remaining objects.

6. A method of making tray liners as defined in claim 5 wherein the quenching is achieved by spraying the object with water while the object is in the foam.

7. A method of making tray liners as defined in claim 5 wherein the object is coated with a material selected to prevent the adhesion of the item to the foam.

8. A method of making tray liners as defined in claim 7 wherein the material selected to prevent adhesion is a mineral powder.

9. A method of making a liner for a tray to store a plurality of objects, the method comprising the following steps:
    a sizing a structural foam liner to fit the tray, the foam liner being made of a thermoplastic foam having a softening temperature;
    b heating a first object to be stored to a temperature above the softening temperature of the thermoplastic foam by heating the object in an oven;
    c forming a cavity in the structural foam liner by pressing the heated object by hand into the foam at a desired location on the foam;
    d cooling the object to a temperature below the softening temperature of the foam, and
    e repeating steps b through d for the remaining objects.

10. A method of making tray liners as defined in claim 9 wherein the objects are heated by means of a heat gun before being inserted into the foam.

11. A method of making tray liners as defined in claim 9 wherein the cooling is achieved rapidly by quenching the object with a fluid having a temperature below the softening temperature of the foam.

12. A method of making tray liners as defined in claim 11 wherein the quenching is achieved by spraying the object with water while the object is in the foam.

\* \* \* \* \*